United States Patent
Painchault et al.

(10) Patent No.: US 7,367,099 B2
(45) Date of Patent: May 6, 2008

(54) METHOD FOR ASSEMBLING TWO PARTS HAVING ACCURATE DIMENSIONS AND USE FOR BRAZING OF A LINAC RFQ ACCELERATOR

(75) Inventors: Michel Painchault, Gif sur Yvette (FR); Michel Durand, Voiron (FR)

(73) Assignee: Commissariat a l'Energie Atomique, Paris (FR)

( * ) Notice: Subject to any disclaimer, the term of this patent is extended or adjusted under 35 U.S.C. 154(b) by 261 days.

(21) Appl. No.: 10/495,431

(22) PCT Filed: Dec. 3, 2002

(86) PCT No.: PCT/FR02/04151

§ 371 (c)(1),
(2), (4) Date: May 24, 2004

(87) PCT Pub. No.: WO03/047803

PCT Pub. Date: Jun. 12, 2003

(65) Prior Publication Data

US 2005/0000076 A1    Jan. 6, 2005

(30) Foreign Application Priority Data

Dec. 5, 2001  (FR) .................................. 01 15719

(51) Int. Cl.
*G01M 19/00* (2006.01)
*B23K 31/02* (2006.01)
(52) U.S. Cl. .............................. 29/407.01; 29/407.05; 29/407.09; 29/557; 228/174; 228/262.42
(58) Field of Classification Search ............. 29/407.01, 29/407.05, 407.09, 407.1, 557; 228/174, 228/262.42, 262.61
See application file for complete search history.

(56) References Cited

U.S. PATENT DOCUMENTS 2,707,540 A    5/1955    Morris
3,807,077 A    4/1974    Deck et al.

(Continued)

FOREIGN PATENT DOCUMENTS

DE            620659        10/1935

(Continued)

OTHER PUBLICATIONS

D. Schrage, et al, CW RFQ Fabrication and Engineering, (Los Almos National Laboratory, Conference LINAC 1998), pp. 679-683.

(Continued)

*Primary Examiner*—Essama Omgba
(74) *Attorney, Agent, or Firm*—Oblon, Spivak, McClelland, Maier & Neustadt, P.C.

(57) ABSTRACT

A method of assembling two parts of which the dimensions of one of the parts or the final assembly are to be adhered to with precision. In the part whose dimensions are to be adhered to with the highest level of precision, a groove is machined to have a depth greater than a depth of a zone constituting a closed outline delimiting a space where the assembly exercises constraints, located between these dimensions and the zone, so as to introduce some elasticity.

13 Claims, 5 Drawing Sheets

U.S. PATENT DOCUMENTS

| | | | |
|---|---|---|---|
| 4,276,493 A | * | 6/1981 | Srinivasa et al. ............ 378/144 |
| 4,394,953 A | | 7/1983 | Sonnweber et al. |
| 4,559,580 A | * | 12/1985 | Lutfy ........................ 361/689 |
| 4,729,441 A | * | 3/1988 | Peetz et al. ................. 175/385 |
| 4,821,819 A | * | 4/1989 | Whysong ..................... 299/113 |
| 5,022,581 A | * | 6/1991 | Zimmer ...................... 228/164 |
| 5,211,327 A | * | 5/1993 | Clarke et al. ................ 288/174 |
| 5,289,965 A | | 3/1994 | Yasui et al. |
| 5,344,717 A | * | 9/1994 | Dutton et al. ............... 428/598 |
| 5,441,197 A | * | 8/1995 | Gellert et al. ............ 228/248.1 |
| 5,496,168 A | * | 3/1996 | Renwick ..................... 425/547 |
| 5,501,390 A | | 3/1996 | Allen et al. |
| 5,855,313 A | | 1/1999 | McAfee et al. |
| 6,250,535 B1 | * | 6/2001 | Sollami ...................... 228/132 |

FOREIGN PATENT DOCUMENTS

| | | | |
|---|---|---|---|
| DE | 2414966 | | 10/1974 |
| JP | 54069552 A | * | 6/1979 |
| JP | 04267544 A | * | 9/1992 |
| JP | 05057086 A | * | 3/1993 |

OTHER PUBLICATIONS

Proton Linear Accelerators, A Theoretical and Historical Introduction, (Los Alamos, LA-11601-MS, Jul. 1989), pp. 39-45.

* cited by examiner

METHOD FOR ASSEMBLING TWO PARTS HAVING ACCURATE DIMENSIONS AND USE FOR BRAZING OF A LINAC RFQ ACCELERATOR

TECHNICAL FIELD

The invention relates to a method of assembling, for example via the brazing or soldering, of two parts of precise dimensions, and its application to the brazing of a LINAC RFQ accelerator. The field of the invention is that of mechanical precision engineering.

STATE OF THE PRIOR ART

The heating necessary for brazing engenders, after cooling, undesirable modifications to the dimensions of these parts. The invention proposes to limit the effects of two types of interference convergent with reducing the precision of the dimensions of one of the parts or of the final assembly.

On one hand, a first type of interference is established, whether the parts to be brazed are of the same material or of different materials.

For example, the spreading of the heat during the brazing or soldering thermal cycle creates a thermal gradient introducing constraints and distortions that, if they are plastic, remain irreparable and which are difficult to control. This phenomenon is particularly critical if it takes place near to the brazing zone or to severe tolerance zones for the correct operating of the final object. Thus a section of a thinner part due to a recess or a bore can increase the undesirable thermal gradient because of the geometry.

Another example is the releasing of the internal constraints of the materials, provoked by the high temperatures.

A result of these two phenomena can be uneven micro-distortions that substantially modify some dimensions of the part.

On the other hand, a second type of interference is established during the brazing or soldering of the two parts comprised of different materials, bearing different dilatation coefficients. During the cooling after the brazing, the parts assembled and thus integral, try to return to their initial positions. Also, they pull on each other, thus inducing a series of constraints that mutually distort them.

We will only consider cases when the brazing or soldering zone makes a closed curve, even if it is in a discontinuous manner. Such a curve delimits an internal zone and an external zone.

Figure 1A:
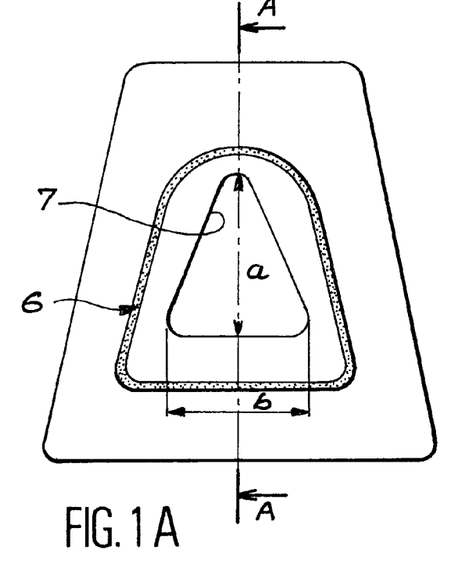
FIGS. 1A and 1B respectively represent a front view and a cross section view AA of a first type of part, in which a recess is located on the inside of a brazing zone, and FIGS. 2A and 2B respectively represent a front view and a cross section view BB of a second type of part, in which a recess is located on the outside of a brazing zone.
Figure 1B:
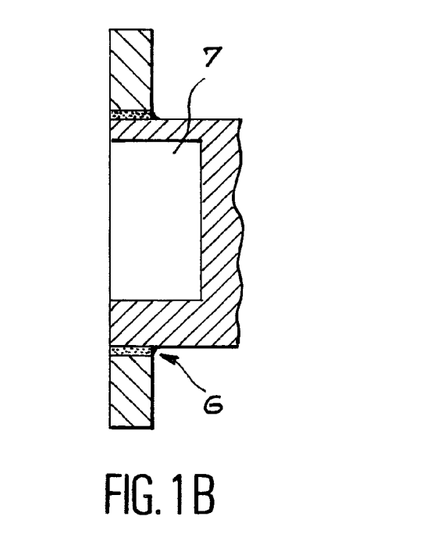
Figure 2A:
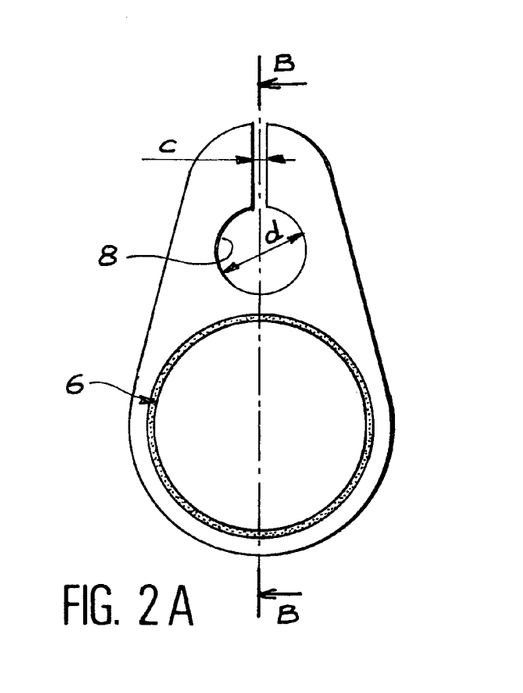
Figure 2B:
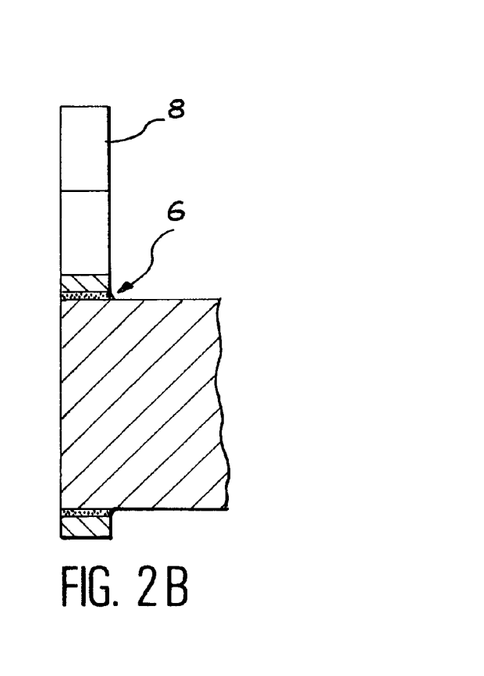

Without restricting ourselves to this case, the benefits of the invention are more obvious when we consider the case when one of the parts has, on a same side of the brazing zone (either in the internal zone or in the external zone), dimensions that must be adhered to as well as a recess or bore of sufficiently large dimensions, as illustrated for example in FIGS. 1 and 2. FIG. 1 represents a part comprising on the inside of a brazing zone 6 several dimensions, for example a and b, that are to be adhered to with precision and a triangular recess 7, with dimensions comparable to the dimensions of this brazing zone 6. FIG. 2 represents a part comprising on the outside of a brazing zone 6 dimensions c and d that are to be adhered to with precision and a bore 8 with dimensions comparable to the dimensions of this brazing zone 6. In such cases, the interference of the first type described above induces micro-distortions that prohibit the maintaining of the precise dimensions a, b, c and d obtained after machining.

The distortions can also be caused by the interference of the second type described above, when the two metals to be brazed are not of the same quality and behave differently depending on the temperature.

The distortions are greatest when interference of the two types cumulates. In extreme cases with at least strong interference of the second type, the micro-distortions can even lead to fracturing within the assembly.

The general brazing techniques are highlighted in the document marked [1] at the end of the description, however the precise adherence to the dimensions is not covered in this document.

The difficulty in correctly planning the behaviour of a unit to be brazed lies in the large number of parameters which are involved: the dilatation coefficients, the mechanical properties of the materials in the elastic and plastic fields which furthermore evolve according to the temperature, the dimensions obtained after machining, the clearances between the parts to be brazed, etc. This number of parameters multiplies, of course, if the chosen solution uses several brazing stages.

The question of rigidity of an assembly thus obtained when the materials have different dilatation coefficients opens out to two types of techniques.

The first group is based on the elasticity of an intermediary layer placed between the parts to be assembled. The document marked [2] thus describes a method to braze a part made in carbon with a metal heat dissipater. The difference in dilatation is then noticeable as it has a coefficient of about 10.

The document marked [3] describes a method in which we insert a ring that plastifies between the two parts to be brazed, by using the super-plasticity of some materials. A typical example of such a technique consists in brazing a copper ring to the inside diameter of a stainless steel flange and then brazing this unit to the copper part to be brazed. The ring has the same dilatation coefficient as the part to be brazed but the first brazing stage makes it possible to create a localised plastic zone that does not then spread to the definitive part.

Another solution consists in inserting one or several layers of materials with an intermediary dilatation coefficient between the two parts to be brazed.

The second group is based on the adding of a discontinuous resilient structure between the two parts to be brazed, as described in the document marked [4].

A plastic ring composed of a material softer than at least one of the parts to be assembled can likewise be inserted between these two parts. In the document marked [5], we increase the plasticity of such a ring by creating indentations on one part and asperities on the other part. The insertion of a distortable ring makes it possible to substantially reduce the positioning errors introduced through brazing, but under no circumstances makes it possible, even with the cited developments, to obtain a precise assembling that does not considerably deteriorate the precise machining of each part.

These documents are not aimed at preserving precise dimensions during brazing. In particular they do not provide any lessons regarding interference of the first type, that meaning in the case when one of the parts has, on a same side of the brazing zone, dimensions that must be adhered to with precision as well as a recess of non-negligible dimensions in relation to the dimensions of this zone. If we refer to FIGS. 1 and 2, these methods induce micro-distortions that do not make it possible to precisely maintain the dimensions a, b, c and d obtained after the machining.

The precise adherence to these dimensions thus requires re-machining, which is costly and sometimes delicate or impossible to perform.

By way of example of application, we can cite the linear accelerators of ionised particles of LINAC RFQ ("Radio Frequency Quadrupole") type, and more particularly the models characterised in that the four pole parts have a vane structure and not made as for lower powered models using conducting rods of variable diameter. A LINAC RFQ of this type has a central casing of approximately tubular shape, made in copper. More precisely, its overall shape is that of a conoid whose outer surface is nearly that of a cylinder, and whose inner surface has four pole outgrowths extending radially towards the centre, without however reaching it. The free central axis allows for the circulation of the particles which thus run along the four poles. This casing is to be brazed at each end to a mounting flange, in stainless steel, which surrounds it.

The positioning of the axis of symmetry is to be done with the highest level of precision in relation to the devices fixed both upstream and downstream. But it is even more important not to induce, via brazing, a crushing constraint which would modify the distances between the ends of the poles facing each other, as these distances are crucial for the operating of the accelerator, this being all the more so as the complex geometry of the unit renders any re-machining impossible.

The other existing vane structured RFQs either accept markedly larger precision or use flanges in glidcop, a copper-based alloy that has its thermal behaviour. The making of such RFQs is described in the document [6]. This document, itself, makes no mention of the thickness of the joints. However, FIG. 2 shows that the mounting flanges have a thickness of 0.5" (that being 12.5 mm), which for those skilled in the art indicates a low tightening torque and thus the use of metal joints. Indeed, a high tightening force would be the origin of a high torque between its contact point and that of the seal, inducing a redhibitory distortion of the flange.

The inconvenience is therefore the obligation to use low tightening torque seals, thus made of polymers, such as Vitron, which do not make it possible to create as high a vacuum within the chamber. The invention makes it possible to use metal joints deemed better, even indispensable for ultra-high vacuum.

We are not aware of any other embodiment of a vane structured RFQ and stainless steel flanges, allowing the use of metal joints.

The purpose of the invention is to overcome the inconveniences of the documents of the known art thus making it possible to obtain in the case when one of the parts has, on a same side of the brazing zone, dimensions that must be adhered to with precision, as well as a recess of non-negligible dimensions in relation to the dimensions of this zone, precise dimensions after an assembling of two parts via brazing, this in order to obtain a precise assembling that does not considerably deteriorate the precision machining of these parts, even if these parts are in different materials.

PRESENTATION OF THE INVENTION

The invention proposes a method of assembling, via brazing or soldering, two parts of which the dimensions of one of the parts or the final assembly are to be adhered to with precision, characterised in that we machine beforehand, in the part whose dimensions are to be adhered to with the highest level of precision, a groove of depth p greater than the depth $p_{br}$ of one zone, for example the brazing zone, constituting a closed outline delimiting a space where the assembly exercises constraints, located between these dimensions and said zone, so as to introduce some elasticity.

The invention indiscriminately applies when the microdistortions described above are of the first or the second type, but it is particularly recommended when these two types cumulate.

Preferably, we insert between the two parts a malleable ring.

The invention has numerous benefits. Firstly it makes it possible to avoid that the operation of brazing or soldering, and the consequential constraints, induce a loss of precision for the dimensions to be adhered to. It also makes it possible to guarantee a high level of precision in the relative positioning of the two parts to be assembled, which is generally advantageous when they share the same axis of symmetry. In the case when one of the parts has a bore that has precise dimensions to be adhered to, the invention allows this dimension not to be penalised during the brazing operation. The invention allows such precision assembly even when the different parts are made in different materials.

When a precise dimension has to be made in an inaccessible area with a tool for re-working, the recourse to the invention proves to be indispensable. In a standard case, it does away with mechanical re-working therefore assembly on a machining tool, which reduces the cost of the finished part.

By adding to the malleable ring, between the brazing zone and the element whose dimension is to be adhered to, a machined groove to one of the parts, the method according to the invention makes it possible to obtain an improved precision assembly in comparison with the prior art. It generates an auto-centring effect, synergetic to the plastic distortion introduced by the ring.

The position and the depth p of this machined groove must be optimised to obtain the best results. The position of the groove is not very critical. It must above all lie between the brazing and the zone, generally bored out, the dimensions of which we want to maintain with precision. It must also be sufficiently close to the zone to be brazed so that the elasticity it induces is effective, but sufficiently distanced from this zone so as to ensure the mechanical aspect of the part. Those skilled in the art will easily find a position that respects these conditions.

The depth p is harder to optimise. It is dependent on the depth $p_{br}$ of the brazed zone, and increases in accordance with the increase in depth. It must be greater than $p_{br}$ and preferably lie between 2 and 3 times the depth $p_{br}$ of the brazed zone.

The setting, and if need be the optimising of the parameters of this groove, is performed through trials in the case of simple and inexpensive parts. For complex and costly parts, as well as when we want to obtain a high level of precision, for example of about a few hundredths of a millimeter, or a precision greater than the machining precision, it is performed using a mechanic CAD code (Castem or Ansys for example) used repeatedly according to the following stages:

1. guesswork evaluating of a position and a groove depth which seem reasonable, the depth p being greater than the depth $p_{br}$ of the zone to be brazed;

2. modelling, for each of the two parts, of the effects of the rise in temperature, until reaching the brazing temperature, notably taking into account the differences in the dilatation coefficients of the materials;

3. when the calculation arrives at a high temperature, the insertion of a manual cell bonding stage when the parts come into contact so as to reconstitute in a continuous manner the cells of the two parts that are to be in contact;

4. modelling of the drop in temperature;

5. checking of the value of the induced constraints, which must remain acceptable, otherwise correction of the depth of the groove (possibly of its position) and a further repeat of the above stages.

The groove being thus defined, we then carry out the brazing itself.

Advantageously, when several brazings are to be performed, or when the shape of the part is complex, we simultaneously carry out all the brazings by placing the filler metal so that, as it is liquid during brazing, it runs between the surfaces that are to be brazed. The filler metal is either in the form of a leaf a few micrometers thick inserted between the two surfaces to be brazed or in the form of wire placed inside shallow grooves, called "brazing grooves", previously machined in one of the parts. Then the unit is placed inside a furnace, which melts in a single operation the filler metal, which makes the various brazings.

Such furnace-made brazings are generally necessary so as to obtain precision assemblies of about a few hundredths of a millimeter. However to obtain the highest level of precision, it is to be used in a two-stage process as we will present in the detailed embodiment of the LINAC RFQ.

Following the brazing itself, we place the resulting assembly on a metrological apparatus to read the dimensions and we define the actual centre of the bore using a mathematical method, for example that of least squares. This centre is defined in relation to previously made markings, and which must themselves be defined with sufficient precision.

The method of the invention can advantageously be used to carry out a LINAC RFQ accelerator. It is particularly advantageous if this LINAC is a vane structure type. In this case the casing of the accelerator is a unit of four pole parts, generally formed of four sectors that are roughly cylindrical, each of which support one of the four poles. The highest level of precision is obtained via the implementation described below, which optimises the performances of the invention and constitutes the optimal realisation. In a first stage, we assemble via soldering or brazing the elastic ring at each end to the corresponding flange. In a second stage, we read, using a metrological apparatus, the dimensions of a set of pre-determined points and we search via calculations the actual position of the bore axis. In a third stage, this position is used to centre the four pole parts, prior to the last stage consisting in melting the weld bead. Such a technique allows for precision greater than that resulting from the machined precision of each part and of the clearances accepted for its installation.

Once the characteristics of the groove have been defined, the following stages are carried out:

1. defining of a reference base, defined on the drawing;

2. machining according to this base of the different parts with their groove, layout of highly precise physical markings (slugs), then brazing;

3. controlling with a metrological apparatus, in order to read the dimensions of a list of predetermined points, their co-ordinates being given in the reference base;

4. searching via the least squares method for the actual position of the bore and defining of a new centre, and therefore of a new base (the invention supposes that the bore is correct but that its actual centre may be offset);

5. the off-setting between the first marking and the second marking is taken into account when expressing in the new base the co-ordinates of the initial markings; they become the references which make it possible to centre the part.

The part is thus centred in relation to the second base.

BRIEF DESCRIPTION OF THE DRAWINGS

FIGS. 1 and 2 diagrammatically represent two types of parts to which the invention could be applied.

DETAILED PRESENTATION OF EMBODIMENTS

The method of the invention is a method of assembly, for example via brazing or soldering, of two parts with precise dimensions, for example of two parts with axial symmetry and made in different materials.

Figure 3:
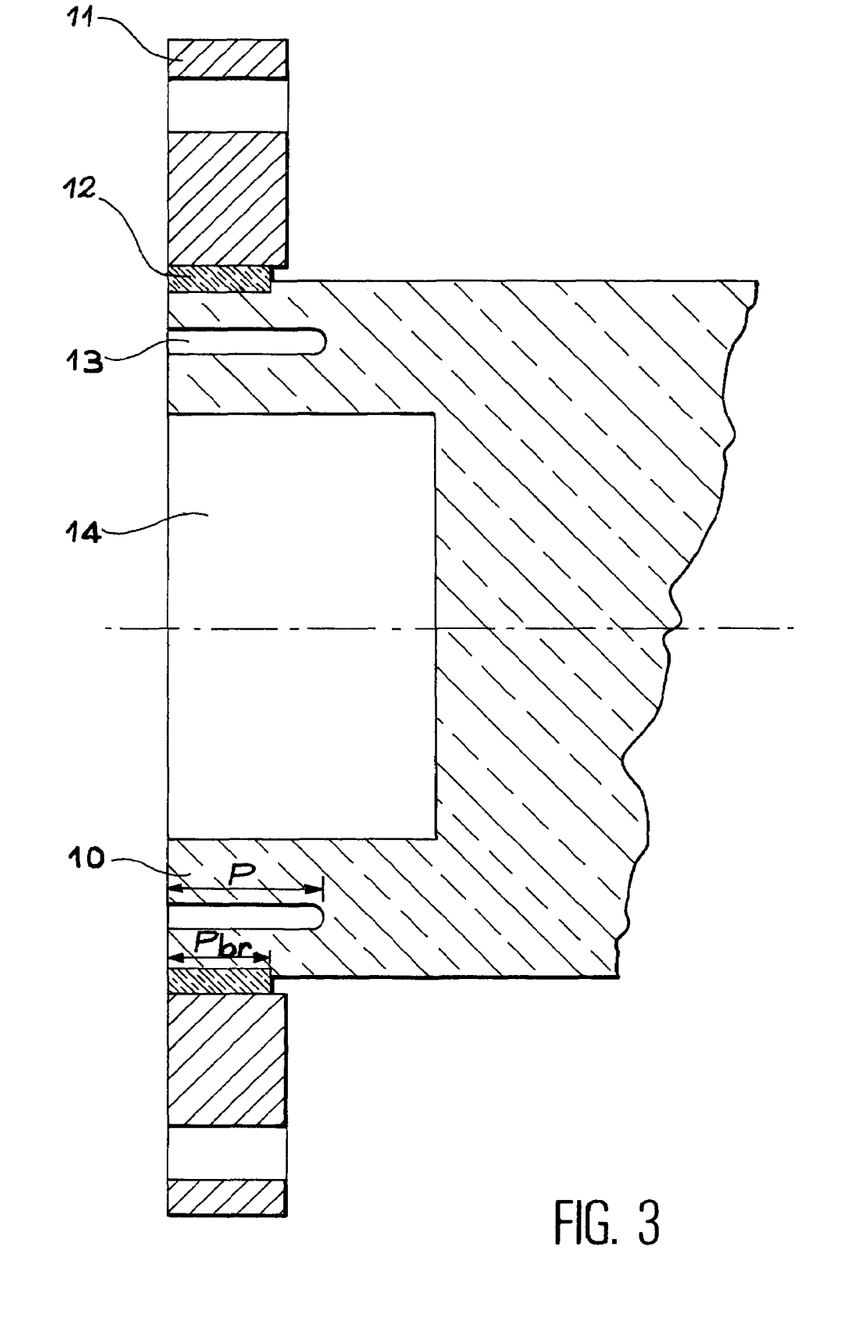
FIG. 3 illustrates the production of an assembly via brazing, according to the invention, of two parts with an axial symmetry.

As is illustrated in FIG. 3, the method of the invention consists in:

possibly inserting a malleable ring 12 between a first part, which in this case is a part 10 with axial symmetry with a recess 14, and a second part, which is a flange 11;

and machining, prior to assembling, a calibrated groove 13 in one of the two parts, the depth p of this groove depending on the depth $p_{br}$ of the brazed zone, and being longer than it, and preferably comprised between 2 and 3 times p.

In the case when the requested precision is sufficiently low so as not to request a modelling via a mechanic CAD code, such a production makes it possible to avoid the need to know the exact difference in the dilatation coefficients between these two parts 10 and 11.

When we aim for high tolerances, the method of the invention is applied avoiding all quantitative studies and precise machining to obtain precise assembling which does not considerably deteriorate the precision machining of the surfaces to be brazed.

On the contrary, when we aim for severe tolerances, the parameters can be optimised, possibly through tests, but preferably with the use of the aforementioned modelling.

Such a procedure supposes a specific use of the calculation codes. When the calculation arrives at a high temperature, with the taking into account of the characteristics of the materials, this usage consists in inserting a manual cell bonding stage when the parts come into contact.

Other and above the benefit of satisfying the desired objective, the machining of such a resilient groove 13 has the benefit of minimising the releasing, during a brazing thermal cycle, of the constraints generated in the material during its elaboration.

An advantageous application of the method of the invention relates to a linear accelerator of RFQ type such as is described in the document marked [7].

Such an accelerator comprises a tubular part, or accelerator casing, whose external section is octagonal and which comprises, on the inside, four pole outgrowths extending radially towards the centre, without however reaching it. On their surface facing the centre these poles are equipped with undulations distributed symmetrically for the two poles of a same plane, and offset by a half-period between a pole and the pole that immediately follows it on a longitudinal profile. This casing is to be brazed at each end on two circular flanges connecting it to the devices located upstream and downstream. After this brazing, the alignment of the symmetry axis is to be done with the highest level of precision in relation to these devices located at the ends. But it is even more important not to induce, via brazing, a crushing constraint that would modify the diameter of the bore at the centre of the casing, as that would modify the relative position of the pole ends facing towards the inside. Furthermore, this position is crucial for the operating of the accelerator. The casing geometry renders all finish-machining or corrective-machining impossible after the brazing operation.

In order to ensure good vacuum tightness, we envisage placing metal joints between two removable parts. This choice leads to the use of stainless steel flanges, the copper not being sufficiently rigid to support the necessary tightening forces of this type of joint. As elsewhere, the structure is in copper, the brazing of the flange on the accelerator casing involves the use of two distinctive materials.

Figure 4:
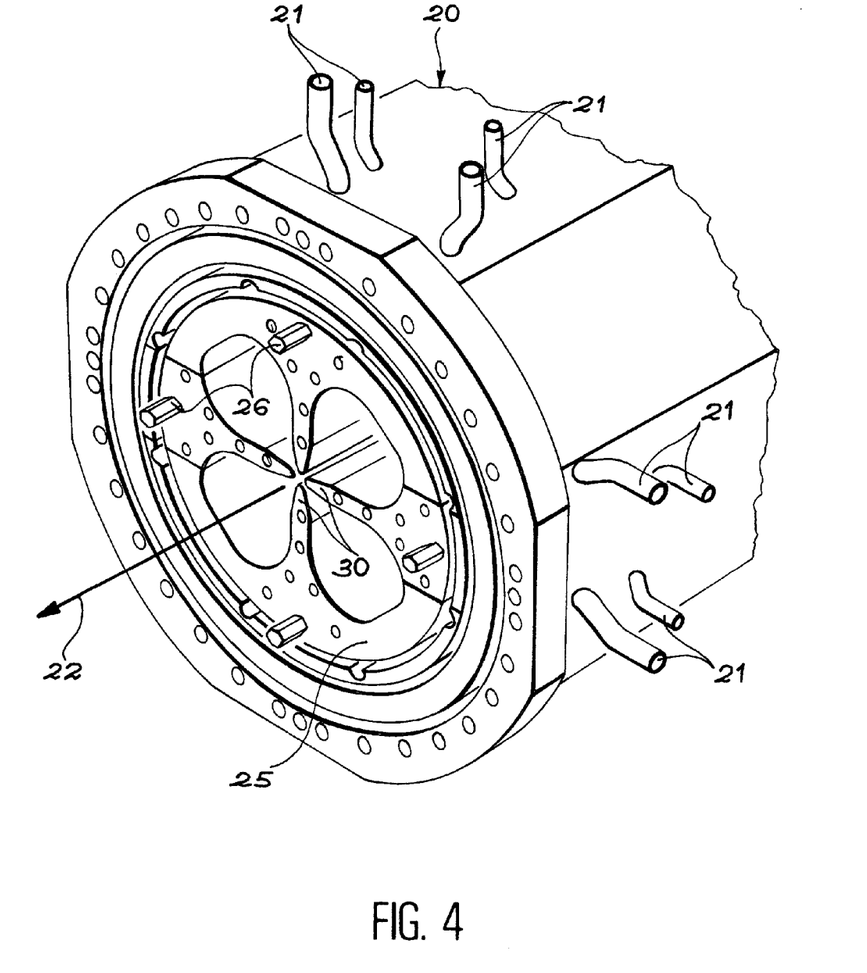
FIG. 4 illustrates a simplified view of the end of a LINAC RFQ type accelerator.

The method of the invention can advantageously be used for the production of such an accelerator, of which one end is diagrammatised in FIG. 4 with notably the pipes 21 allowing the circulation of a cooling flux, the axis 22 being the beamed particle axis as well as the symmetry axis, the first part with axial symmetry to be brazed here being the casing 25 and the second part to be brazed being the flange 26, the four poles being marked 30.

Figure 5:
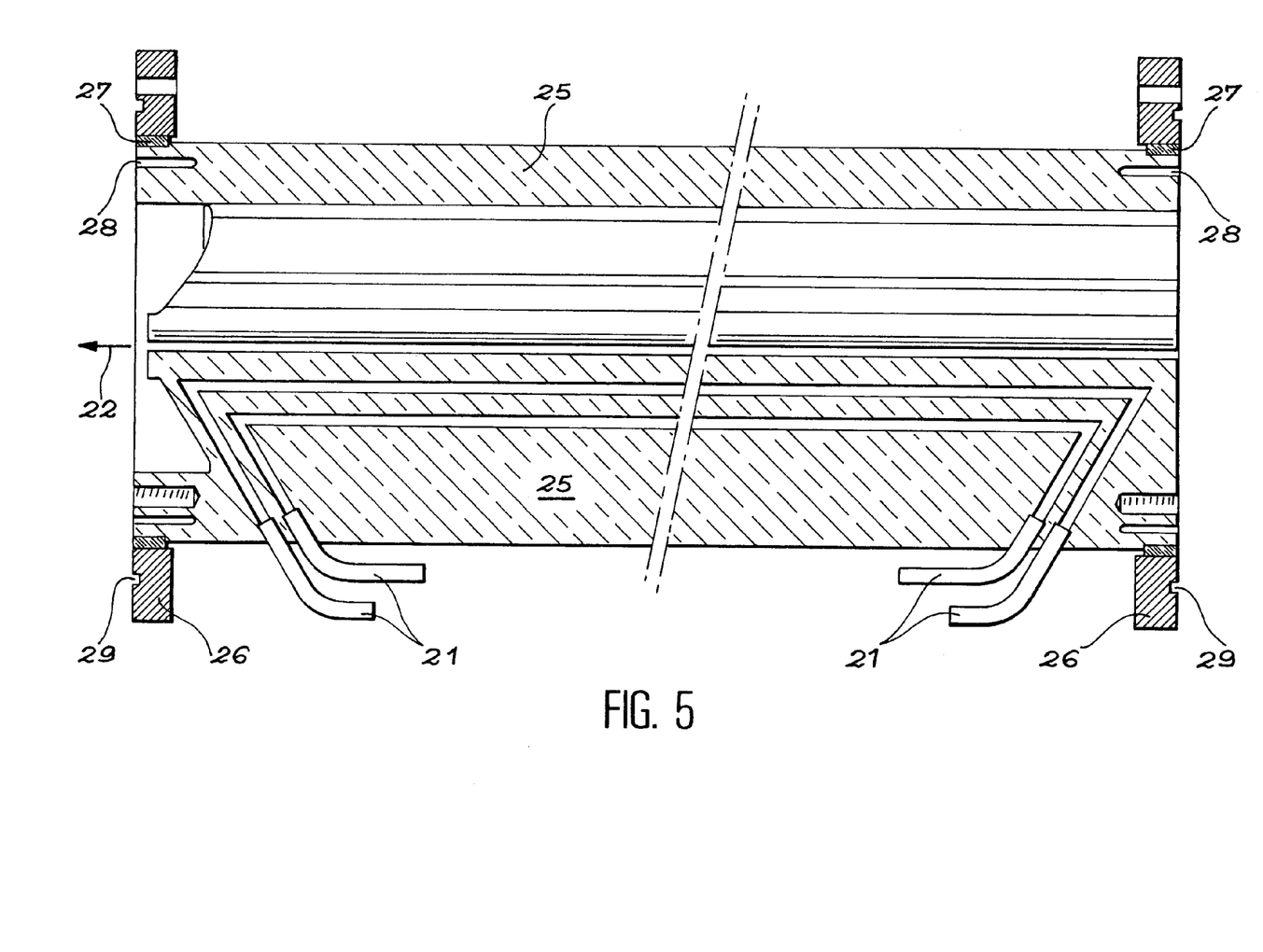
FIG. 5 illustrates the obtained assembly of the casing of such an accelerator on two flanges according to the method of the invention.

FIG. 5 illustrates the unit obtained by thus assembling the copper casing 25 onto two stainless steel flanges 26 according to the method of the invention, the malleable ring 27 being a copper ring, the groove being marked 28. The groove 29 illustrated in this figure is used to introduce a high frequency joint.

The essential requirements for the production of such an accelerator are in order of priority:

the symmetry of the poles according to the longitudinal and transversal axes;
the average adjacent distance between the poles;
the alignment of the poles from one section to the other;
the distance between the poles correct on all points.

These essential requirements translate into tolerances on the pole axes and shape tolerances on the internal surface of the quadrants (end of the poles located near the axis):

the shape tolerance of the poles: 0.02 mm;
the shape tolerances at the bottom of the cavity: 0.05 mm;
the perpendicular aspect between the two poles: (0.02 mm/200 mm).

In normal position, the beam axis seen by each pole is mixed with the others. The ends of the poles located towards the beam are laid out in squares in a section according to a plane transversal to the axis. Nevertheless, the two poles located in one plane are axially offset by half an undulation in relation to the two poles located in the orthogonal plane. Thus when the cross section plane moves axially, this figure created by the pole ends located towards the beam successively forms a square, a rhombus whose large axis is vertical, a square, a rhombus whose large axis is horizontal, a square, and so forth.

The two planes of symmetry are to be adhered to by +/−0.01 mm. A distortion forming a rhombus is acceptable.

To restrict the distortion of the rhombus, we add a positioning tolerance of the pole axis in relation to the axis of the beam in the form of a shape tolerance of the ruled surface, which constitutes the end of the poles.

A simple calculation presuming a dilatation difference of $1.10^{-6}$ which is very small and to be specific corresponds to the measurement limit of this type of parameter, shows that in the given dimensions the brazing should induce a distortion of about 0.1 mm.

$$\Delta L = 140 \text{ mm} \times 1.10^{-6} \times 1000° \text{ C.} = 0.14 \text{ mm}$$

Furthermore, we saw that we aimed for distortions of about 0.01 mm. The difference between the desired value and the dilatation coefficient clearance offers a large freedom of movement for parasite phenomena.

The method of the invention makes it possible to satisfy such essential requirements. The method of the invention then comprises two brazing stages. The first stage is a brazing stage of one of the parts, the stainless steel flange 26, with the intermediary copper ring 27. This intermediary part is sufficiently thin to undergo distortions from the first part. The second stage is a brazing stage of this unit with the copper accelerator casing 25.

The casing thus defined is not practically feasible in one part. It is in fact made of four parts, and the brazings are all done together using a furnace as mentioned above.

Figure 6:
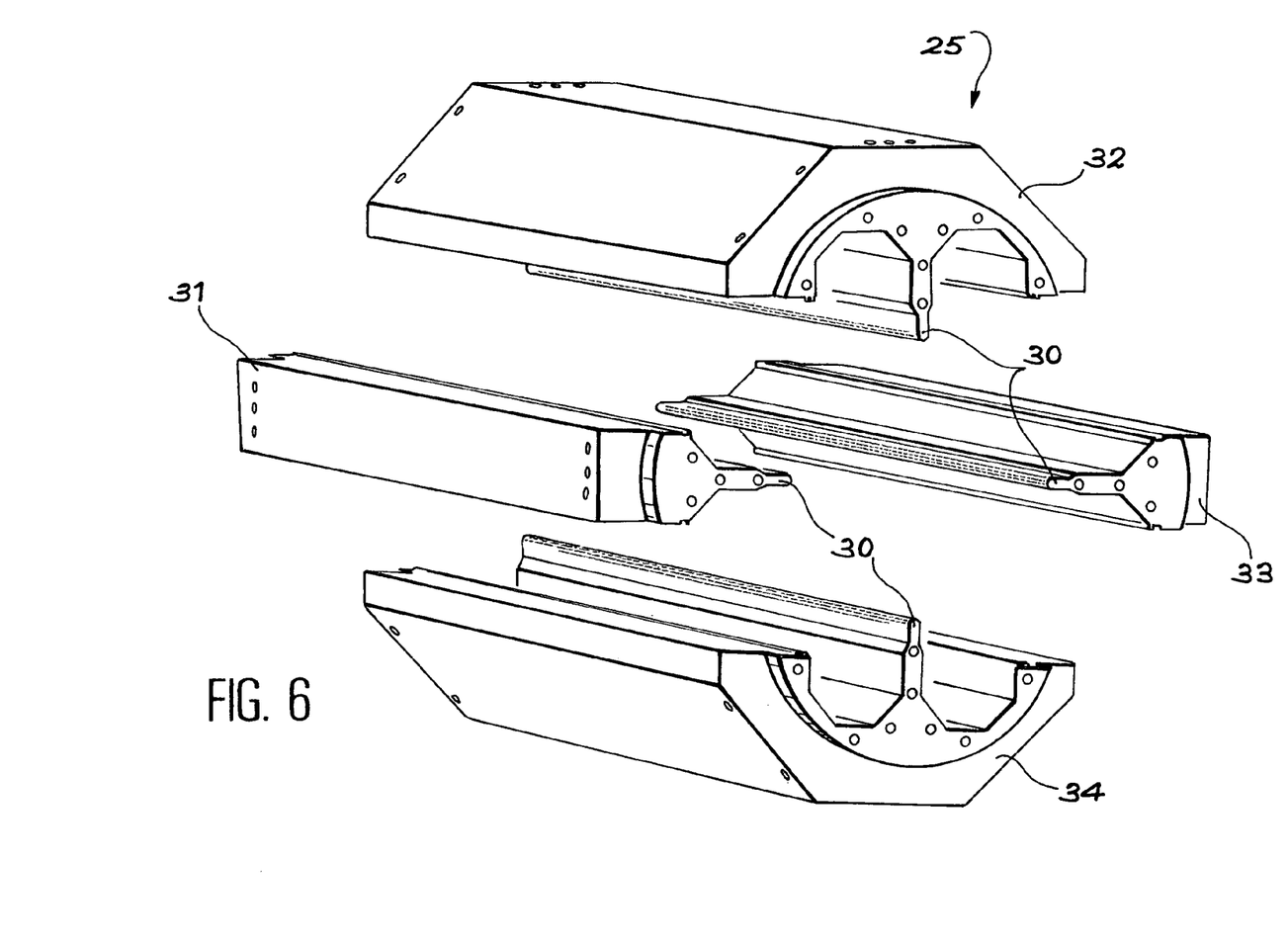
FIG. 6 illustrates the genuine production of the casing of such an accelerator, constituted of four elements.

FIG. 6 illustrates the actual constitution of the casing 25 of such a four-part accelerator (31, 32, 33 and 34). Indeed, according to the invention, the parts to be brazed are not necessarily monolithic. The accelerator casing, which is centrally positioned, is actually made of four parts.

More precisely, the accelerator requires on one hand the assembling of four elements together, which is done without the need for a ring and a groove according to the invention but via a furnace brazing, and at each of the ends of this unit a brazing according to the invention, with ring and groove with a depth of 2 to 3 times p. But prior to this, each of the copper rings has been individually brazed to one of the stainless steel flanges, then the inside of each ring has been corrected before carrying out in a second stage the assembling in the furnace of all of the four vane structure parts with the end flanges.

For this second stage, over all the surfaces to be brazed, we place in a "brazing groove" machined on one of the parts, not represented in FIG. 6, a wire constituted of the filler metal, then the unit is placed in a furnace which melts the filler metal and simultaneously produces the corresponding brazings.

The method of assembling according to the invention is particularly advantageous for the assembling of LINAC RFQs. It however remains applicable to all types of LINACs, as well as applications requiring less precision, such as travelling-wave tubes, even some klystrones.

The invention can be applied generally in all cases when a method of assembling defines a zone constituting a closed outline delimiting a space where the assembly exercises constraints, comparable in this way to the brazing zone, on the inside of which are dimensions that are to be adhered to with precision as well as at least one recess of non-negligible dimensions in relation to the dimensions of this zone. It can thus be transposed to a tight fit, in which a central part is tightly held by the other part whose internal diameter is slightly too small. To produce such a tight fit, we heat the external part, or we energetically cool the central part, or we even simultaneously apply these two treatments. Once back to thermal equilibrium, the central part is well fixed, and in a certain manner compressed by the part which is clamping it. The invention can then be applied to create on the central part a zone where the constraints are lower and the dimensions better controlled.

REFERENCES

[1] "Constructions soudées, brasage" [Soldered, Brazed Structures] by Léon Noël (Engineering Techniques, marked B 5195)
[2] U.S. Pat. No. 5,855,313
[3] U.S. Pat. No. 5,289,965
[4] U.S. Pat. No. 2,707,540
[5] U.S. Pat. No. 5,501,390
[6] "CW RFQ Fabrication and Engineering" by D. Schrage, L. Young and al. (Los Alamos National Laboratory, conference LINAC 1998)
[7] "Proton Linear Accelerators, A Theoretical and Historical Introduction" (Los Alamos, LA-11601-MS, July 1989)

The invention claimed is:

1. A method of assembling, by a brazing or soldering, two parts comprising the following step:
    machining, prior to assembly, an elasticity groove in one of the two parts, dimensions of the one part having to be maintained with precision,
    wherein said elasticity groove is situated between a first zone of constraints created by operation of brazing or soldering between the two parts and a second zone the dimensions of which must be maintained with precision, and wherein said elasticity groove has a depth formed between 2 and 3 times the depth pbr of the first zone of constraints.

2. A method set forth in claim 1, further comprising inserting a malleable ring between the two parts.

3. A method set forth in claim 1, applied to two parts of which one has, on a same side of the first zone of constraints, dimensions that must be adhered to with precision and at least one recess.

4. A method set forth in claim 1, applied to two parts whose dilatation coefficients are different.

5. A method set forth in claim 1, wherein the groove is made on one part of the assembly located at a center.

6. A method set forth in claim 1, wherein the groove is made on one part of the assembly located at a periphery.

7. A method set forth in claim 1, wherein all brazings are simultaneously performed in a furnace.

8. A method of assembling a succession of two parts joined in twos according to the method set forth in claim 1, wherein a filler metal is placed in contact with each twos of parts to be assembled, and the unit is held in position and placed in a furnace that melts in a single operation the filler metal, and performs brazings.

9. A method of assembling a set of parts comprising a central element itself including plural parts, connected at each of their ends by a part that surrounds the plural parts, wherein only brazings between end parts and the central parts are performed according to the method set forth in claim 1.

10. Use of the method set forth in claim 1 for producing a LINAC RFQ type accelerator.

11. A method of assembling, by a brazing or soldering, two parts of which dimensions of one of the two parts or of a final assembly are to be adhered to with precision, comprising:
    machining in the one part whose dimensions are to be adhered to with precision, before assembling, a groove to have a groove depth greater than a depth of a zone constituting a closed outline delimiting a space where the assembling exercises constraints, located between the dimensions and the zone, to introduce some elasticity; and
    inserting a malleable ring between the two parts,
    wherein the malleable ring is firstly brazed or soldered to one of the parts, then corrected for at least one of the dimensions to be adhered to, then brazed or soldered to the other of the parts.

12. Use of the method set forth in claim 11, wherein the LINAC RFQ type accelerator is of vane structure.

13. A method of assembling, by a brazing or soldering, two parts of which dimensions of one of the two parts or of a final assembly are to be adhered to with precision, comprising:
    machining in the one part whose dimensions are to be adhered to with precision, before assembling, a groove to have a groove depth greater than a depth of a zone constituting a closed outline delimiting a space where the assembling exercises constraints, located between the dimensions and the zone, to introduce some elasticity,
    wherein parameters of the groove are defined using distortion simulations by a mechanic code by reproducing each of principal brazing stages of:
    (a) judge rating of a position and the groove depth which seem reasonable, the groove depth being greater than the depth of the zone;
    (b) modelling, for each of the two parts, effects of a rise in temperature, until reaching a brazing temperature, taking into account a difference in dilatation coefficients of materials;
    (c) controlling with a metrological apparatus, to read dimensions of a list of predetermined points, their co-ordinates being given in a reference base;
    (d) searching by least squares method for an actual position of a bore and defining a new center, and therefore a new base;
    (e) off-setting between a first marking and a second marking is taken into account when expressing in the new base co-ordinates of initial markings; which become references that make it possible to center the part.

* * * * *